United States Patent [19]

Griffin et al.

[11] Patent Number: 4,764,120

[45] Date of Patent: Aug. 16, 1988

[54] STUDENT RESPONSE SYSTEM

[75] Inventors: Bruce J. Griffin, Barrington; Roger Kopanski, Elmhurst, both of Ill.

[73] Assignee: McDonald'S Corporation, Oak Brook, Ill.

[21] Appl. No.: 867,479

[22] Filed: May 27, 1986

[51] Int. Cl.$^4$ .............................................. G09B 7/00
[52] U.S. Cl. .................................... 434/336; 364/419;
364/409; 235/386; 235/56; 434/350
[58] Field of Search ............... 364/419, 411, 409, 407;
235/386, 384, 56; 434/350, 336

[56] References Cited

U.S. PATENT DOCUMENTS

| | | | |
|---|---|---|---|
| 3,227,364 | 1/1966 | Clark | 235/56 X |
| 3,647,926 | 3/1972 | Rohloff | 434/336 |
| 3,656,243 | 4/1972 | Segal | 434/336 |
| 3,694,935 | 10/1972 | Friedman | 434/336 |
| 3,947,669 | 3/1976 | Simmons | 364/409 |
| 4,004,354 | 1/1977 | Yamauchi | 434/336 |
| 4,377,870 | 3/1983 | Anderson | 235/386 X |

Primary Examiner—Jerry Smith
Assistant Examiner—Steven Kibby
Attorney, Agent, or Firm—Jenner & Block

[57] ABSTRACT

A student response system which centrally processes student response data received from a plurality of classrooms. The system includes a main controller coupled to an instructors's terminal in each of the classrooms. The system also includes a plurality of student response keypads in each of the classrooms as well as a plurality of student data controllers associated with each of the classrooms wherein each student data controller is coupled to a group of keypads to accumulate data therefrom. The main controller is responsive to commands from an instructor's terminal to control each of the student data controllers in the instructor's classroom to accumulate data from the keypads in a particular manner for transmission to the main controller which then processes the data. The student response system may be operated in a Sign-On mode, Test mode, Survey mode or Student Election mode and may further be used to generate seating charts for each of the classrooms.

16 Claims, 10 Drawing Sheets

SIGN-ON STUDENTS

SEATING CHART

| | ROW 7 | ROW 6 | ROW 5 | ROW 4 | ROW 3 | ROW 2 | ROW 1 | |
|---|---|---|---|---|---|---|---|---|
| SEAT 1 | | | | | | | MARY 147 | |
| SEAT 2 | | | | MARK 116 | DONNA 47 | | BOB 52 | PODIUM |
| SEAT 3 | | | | ALICE 201 | | BILL 64 | RON 23 | |
| SEAT 4 | | | | | BRUCE 34 | | JO 14 | |
| SEAT 5 | | | | LINDA 42 | | | KATHLEEN 176 | |
| SEAT 6 | | | | BARB 75 | | | | |
| SEAT 7 | | | KEN 98 | | | | | |
| SEAT 8 | | HOWARD 88 | | | | | | |
| SEAT 9 | | STEVE 101 | | | | | | |

—PRESS ENTER TO RETURN TO MENU—

FIG. 6

FIG. 7 ADMINISTER A TEST

SURVEY CLASS

ADMINISTER BALLOTING

MISS RATE ANALYSIS REPORT

COURSE: 20   CLASS: 381   TEST: 172                    DATE: ___

| TEST QUESTION | ANSWERS | | | | | TOTAL | DIFF- INDX | VAL- INDX |
|---|---|---|---|---|---|---|---|---|
| | A | B | C | D | E | | | |
| 1 | 152 | 0 | 1 | 8 | 0 | 161 | 94 | +0.07 |
| 2 | 20 | 10 | 38 | 93 | 0 | 161 | 58 | 0.26 |
| 3 | 7 | 23 | 94 | 37 | 0 | 161 | 58 | 0.20 |
| 4 | 127 | 21 | 4 | 9 | 0 | 161 | 79 | 0.14 |
| 5 | 19 | 5 | 122 | 15 | 0 | 161 | 76 | 0.25 |
| 6 | 2 | 0 | 19 | 140 | 0 | 161 | 87 | 0.20 |
| 7 | 12 | 0 | 9 | 140 | 0 | 161 | 87 | 0.20 |
| 8 | 28 | 75 | 20 | 38 | 0 | 161 | 47 | 0.29 |
| 9 | 24 | 6 | 6 | 124 | 0 | 161 | 78 | 0.17 |
| 10 | 6 | 145 | 5 | 5 | 0 | 161 | 90 | 0.16 |

STUDENT RESPONSE SYSTEM

TECHNICAL FIELD

The present invention relates to a teaching or student response system and more particularly to such a system which allows students' responses from a plurality of classrooms to be centrally processed.

BACKGROUND OF THE ART

Teaching systems have been known which include multiple student response stations each of which allows a student to enter a response to oral or written multiple choice questions, the entered responses being coupled to an instructor's station for recording or to provide a visual indication thereof. Such known systems are limited in the number of students which may simultaneously use the system. That is, typically only a small number of students in one classroom may use the system at a given time. Further, if use of these known systems is desired in a number of classrooms, duplicate systems must be installed in each room with no central control or means to correlate student responses from all classrooms.

SUMMARY OF THE INVENTION

In accordance with the present invention, the disadvantages of prior teaching systems as discussed above have been overcome. The student response system of the present invention includes a main controller which is coupled to a plurality of classrooms to allow student response data received from each of the classrooms to be centrally processed and correlated if desired.

The student response system of the present invention includes a plurality of student keypads in each classroom, the keypads being operable by a student to enter a response to oral or written multiple choice questions. Each classroom includes a plurality of student data controllers each of which is coupled to a different group of student keypads in the classroom. The student data controllers are responsive to control commands from the main controller for accumulating, in a particular manner, student response data from their associated keypads. Each classroom also includes an instructor's terminal having a CRT display for displaying messages from the main controller and a keyboard for entering the instructor's command data. The main controller is responsive to command data from an instructor's terminal to provide control commands to each of the student data controllers in the instructor's classroom to control the manner in which each of the student data controllers accumulates data and transfers the data to the main controller. The main controller then processes the data according to the instructor's command data.

The student response system of the present invention may be operated by the instructor in a number of modes to process information from the student keypads. In a Sign-On mode, the students are allowed to enter student identification numbers on their individual keypads. From the sign-on information, the main controller may determine whether any unauthorized students are present in a particular classroom and may notify the instructor if unauthorized students are present. The main controller may also use the sign-on information to automatically generate a seating chart for the instructor, the seating chart being displayed on the instructor's CRT or printed. In a Test mode, the students may respond to test questions in any order by entering a test question number and a response. The main controller grades each student's test and during the grading operation compiles data regarding the difficulty and validity of each test question. The system may also be used to take a survey in which one question is presented to a group of students and the student responses to the survey question immediately processed and displayed in terms of the number of and percentage of students selecting each of the possible responses. The system of the present invention may also be used to hold student elections in which the results of the election are known immediately.

Because the student responses are centrally processed by the main controller, the main controller may correlate student tests results for students taking the same course at the same time but in different classrooms. The student election or balloting mode may be used to run student body elections as well as elections limited to a particular classroom. Further, student profiles may be compiled by the main controller in which a student's grades for a number of different courses may be stored in one file.

These and other objects and advantages of the invention, as well as details of an illustrative embodiment, will be more fully understood from the following description and the drawings.

BRIEF DESCRIPTION OF THE DRAWINGS

FIG. 6 is an illustration of a displayed seating chart presented on the instructor's CRT;

FIG. 10 is an illustration of a report provided by the main controller of the present invention.

BEST MODE FOR CARRYING OUT THE INVENTION

Figure 1:
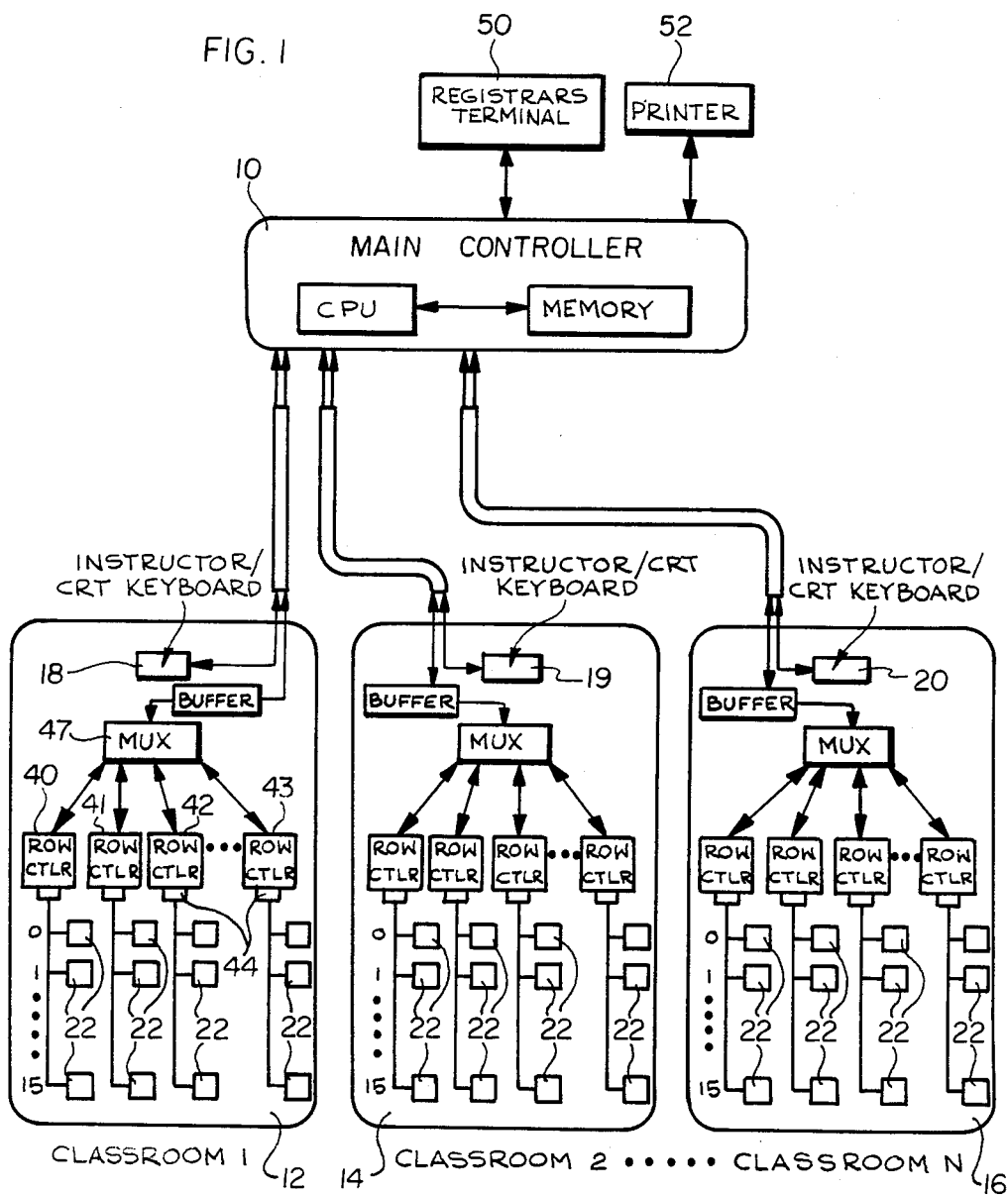
FIG. 1 is a block diagram illustrating the student response system of the present invention.

The student response system of the present invention, as shown in FIG. 1, includes a main controller 10 which responds to instructor commands from each of a plurality of classrooms only three of which, 12, 14 and 16, are shown to control the accumulation and transmission of data from the classrooms as well as the processing of the data. The main controller is a computer having a central processing unit and a memory for storing software and data. A suitable main controller is an ALTOS computer.

An instructor's terminal 18, 19, 20 is installed in each of the respective classrooms 12, 14 and 16 wherein the terminals preferably form an integral part of the instructor's podium. Each of the instructor's terminals 18, 19 and 20 includes a CRT display for displaying messages from the main controller 10 and a keyboard which allows the instructor to enter input commands which identify a particular mode of operation desired by the instructor. For example, the main controller, in response to an input command from an instructor's terminal, may operate in a Sign-On mode, a Test mode, a Survey mode, or a Student Election mode.

Figure 2:
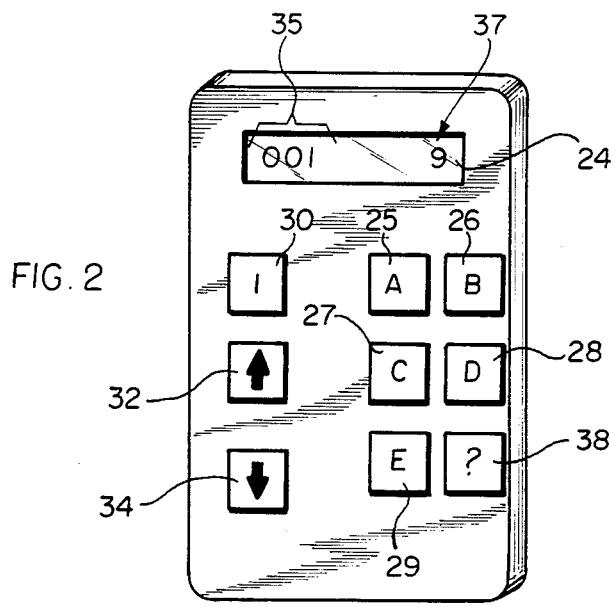
FIG. 2 is a perspective view of a student response keypad.

In each classroom student response keypads 22, preferably one keypad for each available seat in the classroom, are provided to allow students to respond to multiple choice questions posed by the instructor. As shown in FIG. 2, each student response keypad 22 includes an LED display 24 and a number of push buttons actuable by a student to enter alphanumeric data. In order to enter numerical information, a push button 30 labelled "1" is provided as well as an up arrow push button 32 and a down arrow push button 34. In order to enter a number greater than 1, a student merely presses the "1" button 30 and thereafter presses the up arrow push button 32 until the left-hand portion 35 of the LED display 24 is incremented to the desired number. To decrease the number shown on the LED display 24, the down arrow push button 34 is pressed. Responses to multiple choice questions are entered by means of the push buttons 25-29 respectively labelled A-E. When response data is entered using push buttons 25-29, the letter A, B, C, D or E associated with the selected push button is displayed on the LED display 24 at position 37. As shown in FIG. 2, the keypad 22 is in an initial, cleared state in which the number 9 is displayed in position 37 and 001 is displayed in position 35. The keypad includes an additional push button 38 labelled with a question mark. The push button 38 may be used by a student to automatically display the first question number which the student left unanswered in responding to a group of sequentially numbered test questions. For example, in answering a test with ten questions, if the student skips questions 2 and 4, by pressing the "1" button 30 and thereafter the button 38, the display 24 will depict 002 in the display portion 35 so that the student may enter a response. Thereafter, if buttons 30 and 38 are again pressed, the number 004 will be displayed in the portion 35. The push button 38 allows the student response system to keep track of answered and unanswered questions to thereby facilitate test taking.

Each of the student response keypads 22 in a classroom is coupled to one of a plurality of student data controllers such as controllers 40-43 shown for classroom 12. The student data controllers 40-43 respond to control commands from the main controller to (1) lock and unlock the keypads coupled thereto; (2) control the LED display 24 of the keypads; (3) accumulate data from the keypads in a particular manner; and (4) transmit the accumulated data to the main controller 10. Each student data controller in each of the classrooms includes a central processing unit and a memory for accumulating data from the keypads in accordance with control commands from the main controller. A suitable student data controller may include a Motorola 6801 CPU. Further, each student data controller includes a short haul modem 44 for transmitting data to the keypads.

Figure 3:
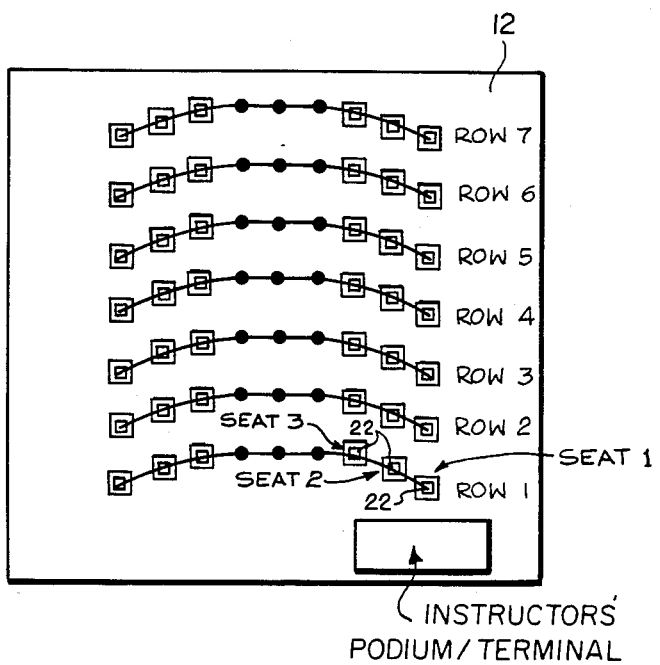
FIG. 3 is an illustration depicting the layout of a classroom employing the student response system of the present invention.

Each student data controller may be associated with a particular row in a classroom such that for each row of seats in the classroom there is one student data controller. For example, for a classroom such as shown in FIG. 3 having seven rows of seats, there are seven student data controllers each associated with a different row. Each seat in each of the rows has an associated student response keypad which is coupled to the student data controller associated with the row in which its seat is located. For simplicity, hereinafter each of the student data controllers 40-43 will be referred to as row controllers.

The main controller 10 is coupled to the row controllers of a given classroom through a buffer 45 and a multiplexer 47. An SMAO1-186 communications adapter from Black Box Corporation is a suitable buffer and a SW852 code operated switch also from Black Box Corporation is a suitable multiplexer. The multiplexer is responsive to a code from the main controller 10 to couple control commands from the main controller 10 to the particular row controller identified by the code. The multiplexer maintains communication between the main controller 10 and that particular row controller so that data and control commands may be transmitted therebetween until a code identifying a different row controller is received by the multiplexer from the main controller.

Also coupled to the main controller 10 is a registrar's terminal 50 and a printer 52. The registrar's terminal 50 may include a CRT display for providing information to the registrar from the main controller 10. The terminal 50 may also include a keyboard to allow the registrar to input information to the main controller 10. The printer 52 is used to print various reports as discussed below. Upon registration, the registrar inputs background information regarding a student into a student background file stored in the memory of the main controller 10. At this time, the main controller assigns the student to a particular course and a classroom in which the course is to be taught. The main controller also assigns a three digit student identification number to the student to allow the student to use the student response system. At registration, a response system student data file is also set up in the main controller for the student. This file includes the student's identification number, name, social security number, the classroom to which the student is assigned as well as the course number and class number. The response system student data file is also updated when the student signs-on, as discussed below, to include the identification number of the keypad used by the student and the number of the row controller coupled to the keypad.

Figure 4:
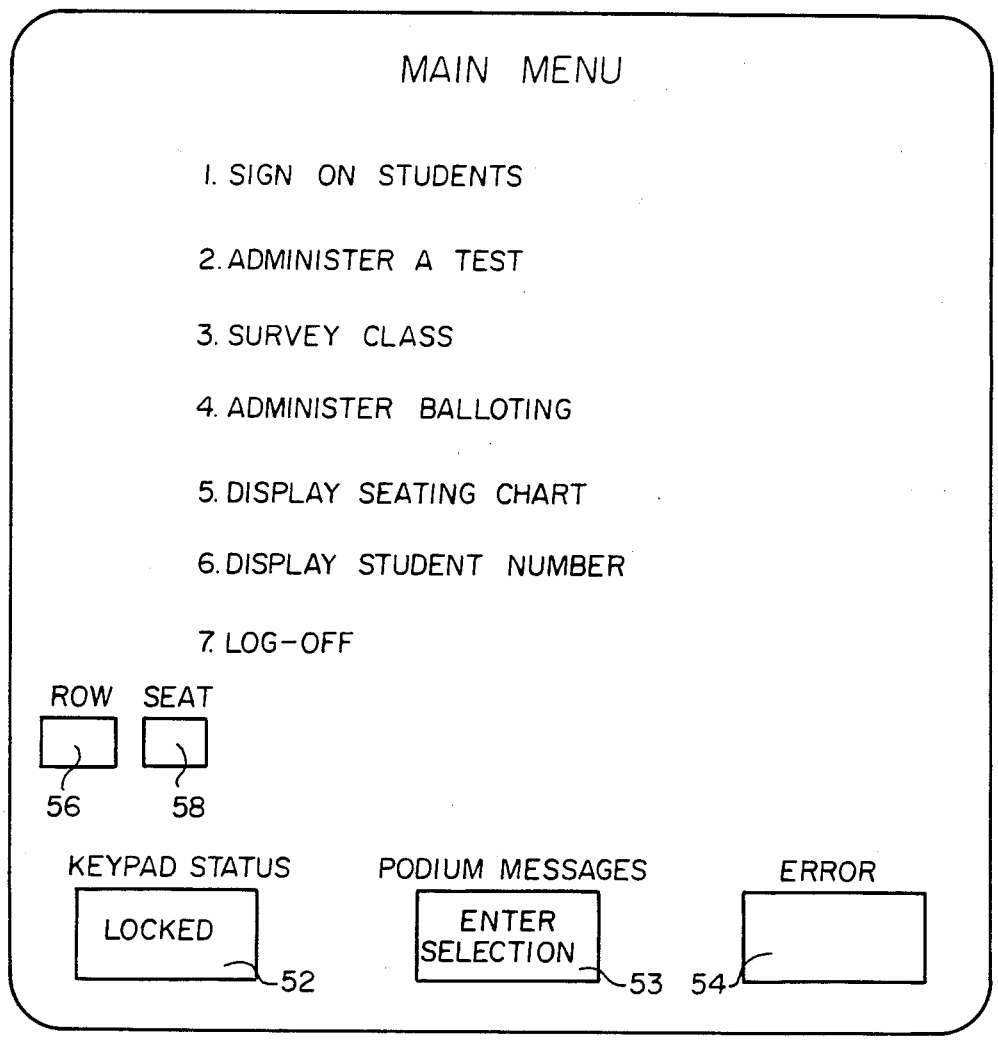
FIG. 4 is an illustration of a display presented on the instructor's CRT.
Figure 5A:
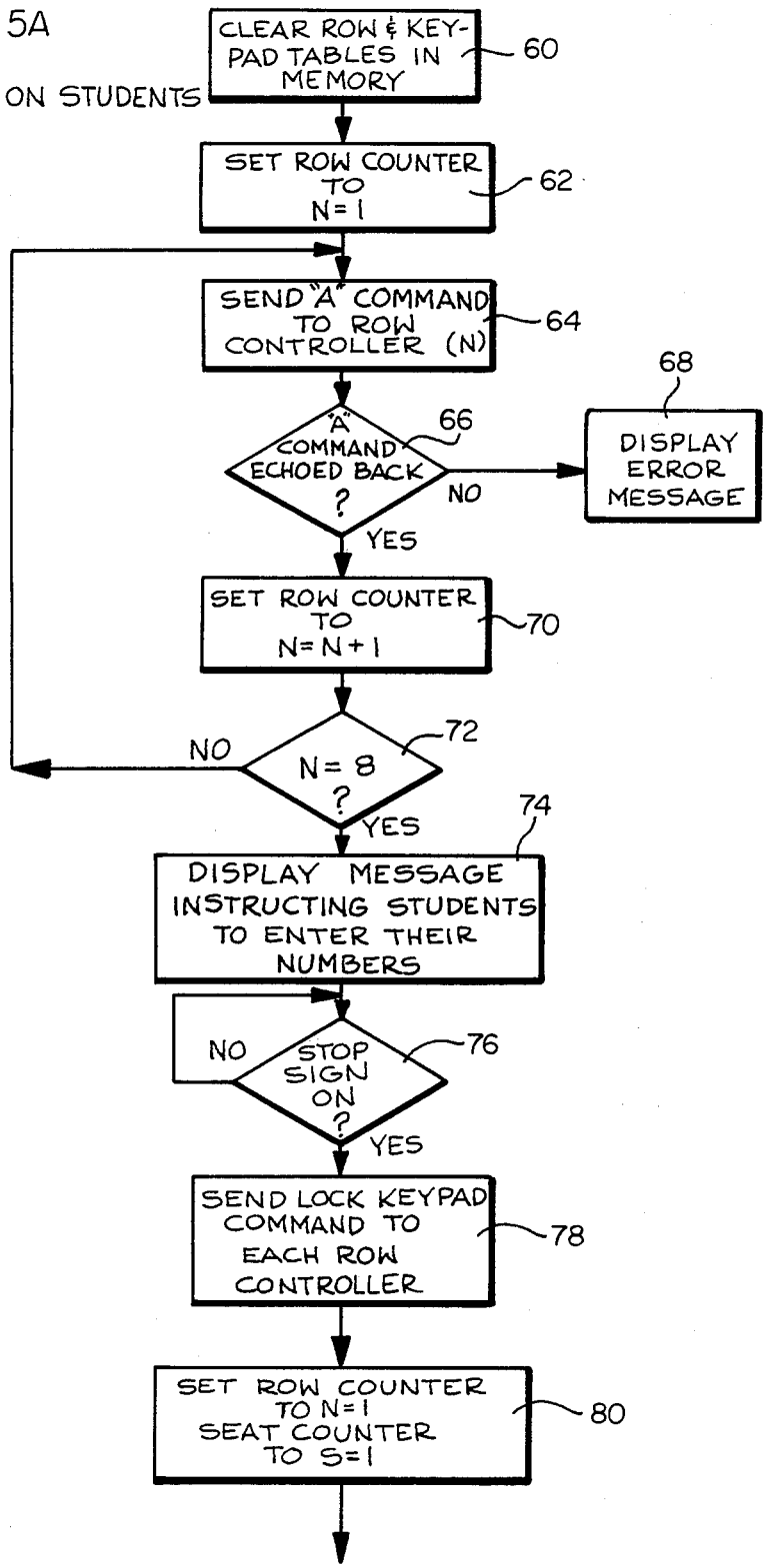
FIGS. 5A and 5B are a flowchart illustrating the sign-on operation of the main controller.
Figure 5B:
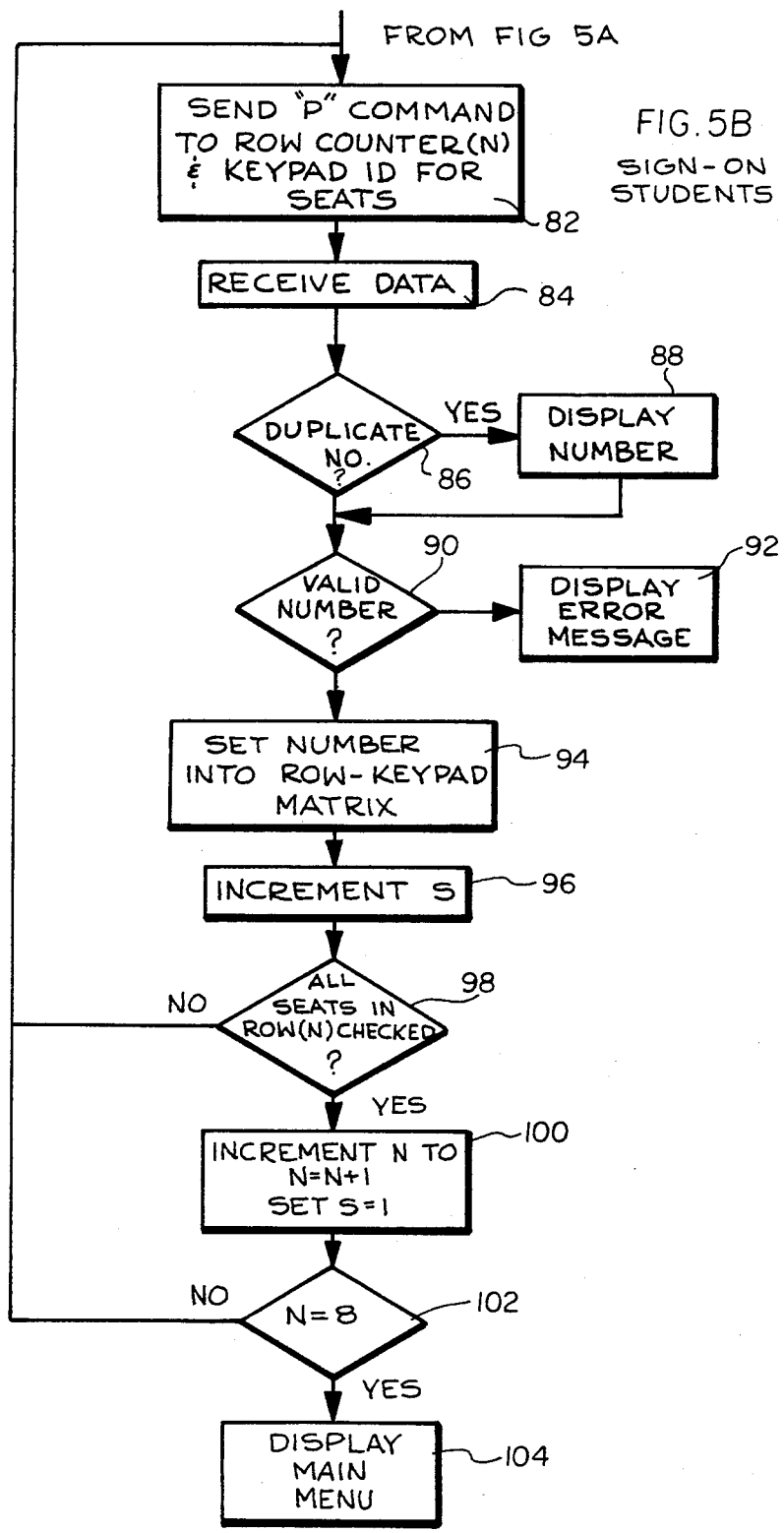

The operation of the student response system depicted in FIG. 1 will now be described with reference to FIGS. 4-10. On the first day of a class for a particular course, students sit at any seat they desire in the classroom to which they are assigned at registration. At the start of the class, the instructor enters the course number and class number on the keyboard of the instructor's terminal 18. Thereafter a main menu as shown in FIG. 4 is displayed on the CRT of the instructor's terminal 18. A portion of the main menu display depicts the various menu choices available to the instructor including: (1) SIGN ON STUDENTS; (2) ADMINISTER A TEST; (3) SURVEY CLASS; (4) ADMINISTER BALLOTING; (5) DISPLAY A SEATING CHART; (6) DISPLAY STUDENT NUMBERS; and (7) LOG OFF. An area 52 of the CRT display labelled KEYPAD STATUS tells the instructor whether the keypads in the classroom are locked or unlocked. When the keypads are unlocked, the students may enter student response data into the system and when the keypads are locked, the students may not. Adjacent the KEYPAD STATUS area 52 of the display is an area 53 labelled PODIUM MESSAGES at which messages are displayed to prompt the instructor to take various actions. Error messages are displayed at an area 54 of the display labelled ERROR. The areas 56 and 58 of the CRT display, respectively labelled ROW and SEAT, are used to display the number of the row controller 40–43 presently coupled to the main controller 10 for communication therebetween as well as the seat in the row associated with the keypad whose data is currently being processed by the main controller.

At the start of the class the instructor will first sign-on the students to determine whether all students in the classroom are authorized to be there; correlate each keypad in the classroom with the particular student using the keypad to update the response system student data file; and generate a seating chart as discussed below. When the main menu choice "SIGN ON STUDENTS" is selected by the instructor by means of the instructor's terminal, the main controller 10 operates according to the flowchart illustrated in FIG. 5 as follows. The main controller at block 60 first clears the row and keypad tables in its memory. At block 62, the main controller 10 sets a row counter to the value $N=1$. Thereafter, the main controller 10, at block 64, sends an "A" command to the row controller for the first row in the classroom whose instructor has initiated the Sign-On mode. The row controller responds to an "A" command from the main controller 10 by clearing its memory; clearing each of the keypads coupled thereto to the initial state of 001 9; and unlocking each of the keypads so that the students sitting in the row may use the keypads to enter data. The row controller acknowledges receipt of the "A" command by echoing the "A" command back to the main controller 10. At block 66, the main controller 10 determines whether the "A" command has been echoed back after a predetermined period of time and if not, at block 68 the controller 10 displays an error message on the instructor's CRT. If the row controller has acknowledged receipt of the "A" command as determined at block 66, the main controller 10, at block 70, sets the row counter to $N=N+1$ and at block 72 determines whether the "A" command has been sent to each of the row controllers in that particular classroom. For a classroom having seven rows and thus seven row controllers as depicted in FIG. 3, the main controller 10 at block 72 determines whether $N=8$ and if it is not, returns to block 64 to send an "A" command to the next row controller. After each of the row controllers has been initialized by the "A" command from the main controller 10 such that the keypads are unlocked, the main controller at block 74 displays a message to the instructor prompting the instructor to ask the students to enter their student identification numbers on their keypads.

When a student enters his or her student identification number on the student's keypad, the row controller coupled to the keypad stores the student's identification number in a memory location associated with that particular keypad and seat. When the instructor determines that all of the students have entered their student identification numbers on their keypads, the instructor signals the main controller 10 using the instructor keyboard to stop the sign-on process. When the main controller 10 receives the stop sign-on command from the instructor's terminal, as determined at blocks 76, the main controller, at block 78, sends a lock keypad command to each row controller in the classroom. Thereafter, at block 80 the main controller sets the row counter to $N=1$ and a seat counter to $S=1$. At block 82, the main controller 10 sends a "P" command to the row controller associated with the first row and also sends the keypad identification number for the first seat in that first row. In response to the "P" command and keypad number, the first row controller transmits to the main controller 10 the student identification number entered on the keypad associated with the first seat in its row. The main controller 10 at block 84 receives the student identification number data at block 84 and at block 86 determines whether the number is a duplicate. If the student identification number is the same as a student identification number previously entered, the main controller 10, at block 88, controls the instructor's CRT to display the student identification number along with a message indicating that the number is a duplicate. The main controller 10, at block 90, then checks the student identification number to determine whether it is a valid number for the course and classroom. If a student mistakenly sits in a classroom to which he has not been assigned, the main controller 10 will determine this at block 90 and display an error message to the instructor at block 92. If the student identification number is determined to be valid at block 90, the main controller 10, at block 94, sets the student identification number into a row-keypad memory matrix. At this time, the main controller also searches its student data files for the name of the student having the entered student identification number and sets the name of the student into the row-keypad matrix at the same memory location as the location at which the student's identification number is stored. At block 96, the main controller increments S by 1 and at block 98 determines whether the keypad data for all seats in the first row have been checked or not. If not, the main controller returns to block 82 sending a "P" command and the keypad identification number for the second seat to the row controller associated with the first row of seats. Blocks 82 through 98 are repeated for each seat in the first row and when all of the seats have been addressed as determined at block 98 the main controller at block 100 increments N to $N=N+1$ and sets S equal to 1 to begin addressing at block 82 the second row controller beginning with the keypad data stored for the first seat. Blocks 82–100 are repeated until all of the keypad data from each of the row controllers has been transmitted to the main controller 10 as determined by block 102 for a classroom having seven rows. Upon completing the sign-on process, the main controller 10, at block 104, displays the main menu so that the instructor may make another menu selection.

The row-keypad matrix in the memory of the main controller 10 mirrors the classroom for which it is set up so that upon completion of the sign-on process for a particular classroom the matrix contains all of the information necessary for generating a seating chart such as shown in FIG. 6. In response to a display seating chart request from the instructor's terminal, the main controller 10 may control the instructor's CRT to display the seating chart or it may control the printer 52 to print the seating chart. Further, the instructor may request a seating chart with only the names of the students, with only the student identification numbers or with a combination of the student names and student identification numbers such as shown in FIG. 6.

Figure 7:
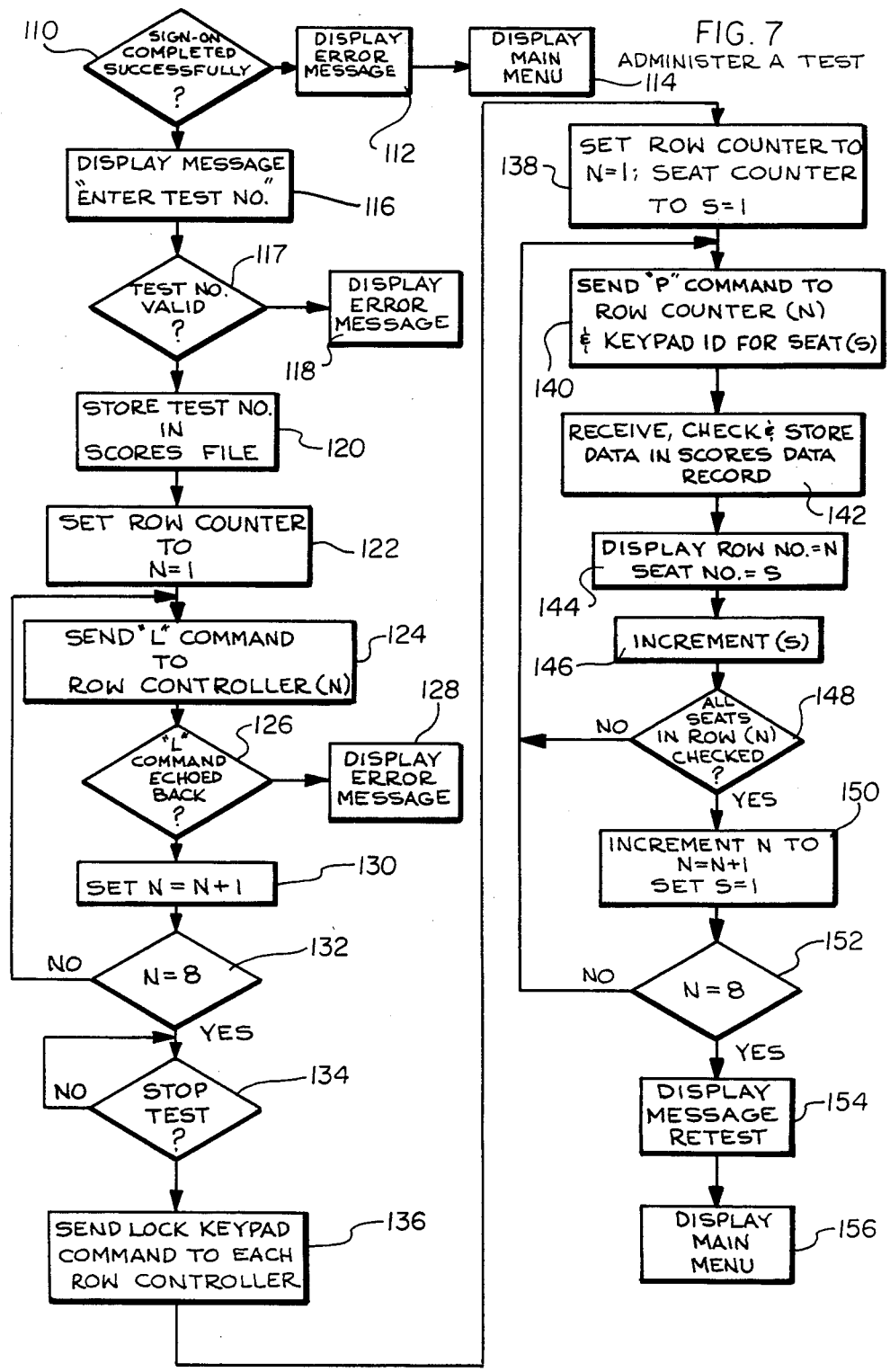
FIG. 7 is a flowchart illustrating the operation of the main controller in administering a test.

After the students have signed on, the instructor may administer a test by orally presenting multiple choice questions to the students or by handing out a written examination with multiple choice questions. To begin the test the instructor selects the Administer a Test mode option on his terminal 18. In response to the Administer a Test command from the instructor's terminal 18, the main controller 10 as shown in FIG. 7 first checks, at block 110, whether the student sign-on operation has been completed successfully. If it is determined by the controller 10 that the sign-on operation has not been completed successfully, the controller 10, at block 112, displays an error message on the instructor's CRT display and thereafter, at block 114, displays the main menu. If the signon operation was successfully completed for the class as determined at block 110, the main controller 10 displays a message prompting the instructor to enter a test number. After the instructor enters the number of the test to be taken, the main controller 10, at block 117, checks the test number to determine whether it is valid and whether the main controller has stored a test number with predefined questions and answers associated therewith. If the test number is not valid, the main controller, at block 118, controls the instructor's CRT to display an error message. If the test number entered by the instructor is determined to be valid at block 117, the main controller 10 at block 120 stores the test number in a SCORES data file to which each of the students' responses are later added with the students' identification number. At block 122, the main controller 10 then sets the row counter to N=1 and at block 124 sends an "L" command to the first row controller.

The row controller responds to the "L" command from the main controller 10 by maintaining the student identification numbers which were entered into its memory during the sign-on operation, but by clearing the remaining portions of the memory. In response to the "L" command, the row controller also clears each of the keypads' LED displays and thereafter accumulates answers from each of the keypads in a particular manner as described below. In order to acknowledge the "L" command from the main controller 10, the row controller echoes the "L" command back to the main controller. The main controller 10 at block 126 determines whether the "L" command has been echoed back from the row controller and if it has not, the controller 10, at block 128, displays an error message on the instructor's CRT. If the "L" command has been echoed back, as determined at block 126, the main controller 10, at block 130, sets N=N+1 and at block 132 determines whether the "L" command has been sent to each of the row controllers in the classroom. For a classroom having seven rows, at block 132 the main controller 10 determines whether N=8 and if it does not, the main controller returns to block 124 to send the "L" command to the next row controller. After the "L" command has been sent to each of the row controllers and acknowledged by the controllers as determined at block 132, the main controller 10 waits until the instructor signals that the test should be stopped.

Once a row controller receives the "L" command and unlocks the keypads to which it is coupled, the students sitting in its row may enter answers to the various test questions by using their keypads. After receiving the "L" command, the row controller responds to alphanumeric data from its keypads by storing data representing the response in a memory location associated with the test question number for that keypad so that the test response data is stored with the student's identification number entered during the sign-on operation. The row controller 10 continues to accumulate test response data from the keypads until instructed by the main controller 10 to stop.

The main controller 10 responds to a stop test command entered by the instructor on the instructor's terminal 18 as determined at block 134 by sending, at block 136, a lock keypad command to each of the row controllers in the classroom. When each of the row controllers receives the lock keypad command, the controller ignores response data entered on the keypads thereafter. At block 138, the main controller 10 sets the row counter to N=1 and the seat counter to S=1 and at block 140 transmits a "P" command to the first row controller with the keypad identification number for the first seat in the row. The row controller responds to the "P" command and the keypad identification number by transmitting to the main controller 10 the test response data stored for that keypad along with the student identification number entered on the keypad during the sign-on operation. At block 142, the main controller 10 receives the data transmitted from the row controller and stores the data in the SCORES data file. At block 144, the main controller causes the row number and seat number for the keypad whose data the controller is currently processing to be displayed on the instructor's CRT. At block 146, the main controller 10 increments S so that the next "P" command will be sent to the next seat in the current row. The main controller 10, at block 146, determines whether the keypad data for all of the seats in the first row has been received and if not returns to block 140. If the keypad data for all of the seats in the first row has been received, the main controller increments N to N=N+1 and sets S=1 so that the next "P" command will be sent to the second row controller instructing the controller to transmit the response data entered on the keypad associated with the first seat in its row. At block 152, the main controller 10 determines whether all of the test response data has been received from each of the row controllers by determining whether N=8 for a classroom having seven rows. If all of the data has been received, the main controller 10 displays a message on the instructor's CRT indicating that test processing has been successfully completed at block 154. At block 156, the main controller 10 then controls the instructor's CRT to display the main menu.

After the main controller 10 receives all of the student response data for a particular test, the controller 10 may proceed to grade the test by comparing each student's responses to the test questions to stored correct answers. As each of the student's tests are scored, the main controller 10 compiles data relating to the students' responses taken as a whole. More specifically, the main controller 10 assigns an accumulator to each possible response for each test question. For each response received from a classroom, the controller 10 increments the accumulator associated with the response by one. The main controller 10 also assigns a total accumulator for each test question, the total accumulator being incremented each time any response to the accumulator's associated test question is received. For a typical test there will be six accumulators associated with each test question number including an A accumulator for counting the number of students choosing an "A" response; a B accumulator for counting the number of students choosing a "B" response; a C accumulator for counting the number of students choosing a "C" response; a D accumulator for counting the number of students choosing a "D" response; an E accumulator for counting the number of students choosing an "E" response and a total accumulator for counting the total number of students responding to the test question wherein the count in the total accumulator equals the sum of the counts in the accumulators associated with responses A through E for the test question.

From the information compiled during the grading of the test, the main controller 10 may calculate a difficulty index and a validity index for each test question. The difficulty index represents the percentage of students answering a particular test question correctly. The difficulty index is determined by dividing the count stored in the accumulator associated with the correct test question response by the count in the total accumulator associated with the test question. The validity index is determined by sorting the students according to the grade each student receives on the test and assigning the top half of the students into a first group and the bottom half of the students into a second group. Next, the main controller determines the number of students in the first group who answered a particular test question correctly as well as the number of students in the second group that answered the test question correctly. The main controller then subtracts the number of students in the second group answering the question correctly from the number of students in the first group answering the question correctly to provide a difference. The difference between those in the first group who answered the question correctly and those in the second group who answered the question correctly is then divided by half the number of people in the class taking the test to provide the validity index. After calculating the difficulty index and validity index for each question on a particular test, the main controller may cause the printer 52 to print out a miss rate analysis report such as shown in FIG. 10 to depict the count in each of the accumulators as well as the difficulty index and validity index for each test question. A report listing each student's test grade may also be printed by the printer 52.

Figure 8:
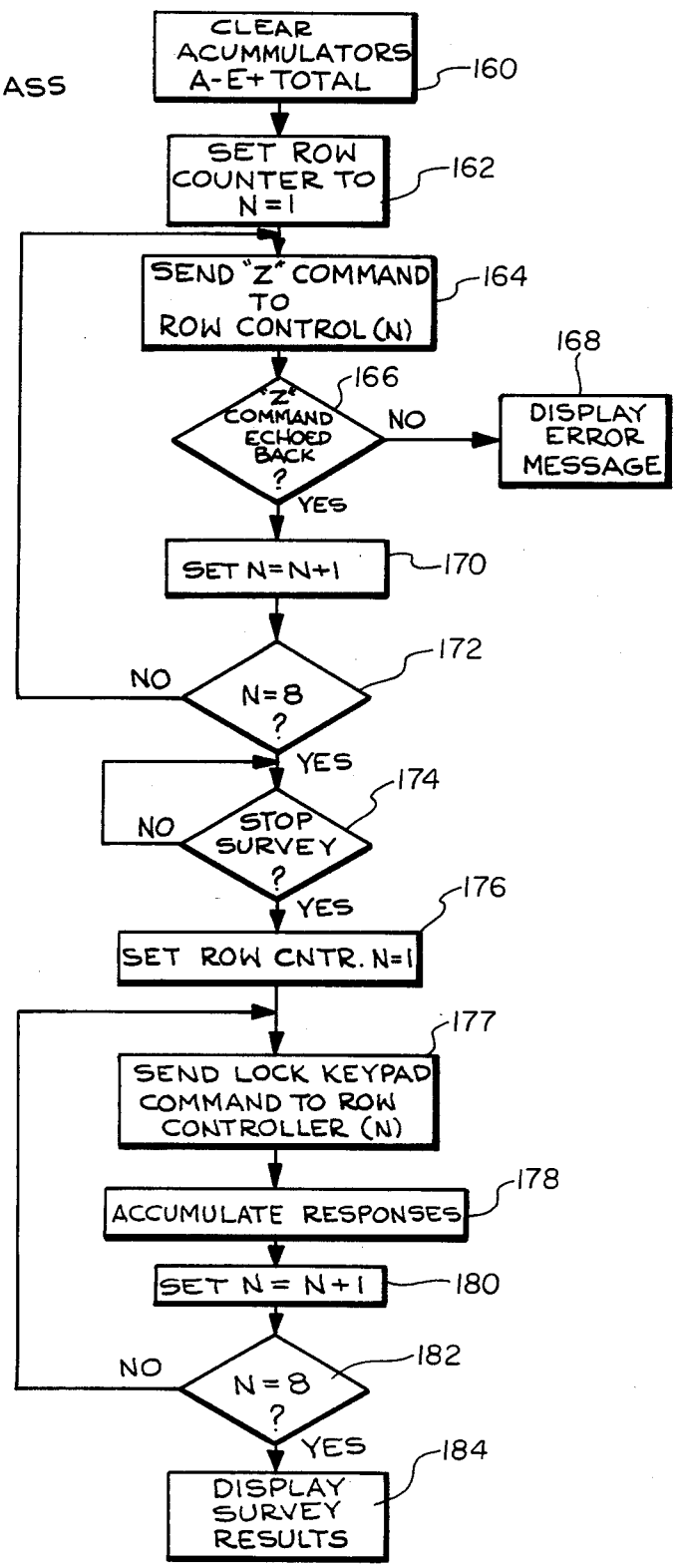
FIG. 8 is a flowchart illustrating the operation of the main controller in taking a survey of a class.

If an instructor wishes to take a survey of a class by asking one question, the instructor may select the Survey Class mode option from the main menu displayed on the instructor's CRT. In response to a Survey Class command from the instructor's terminal, the main controller 10, as shown in FIG. 8 at a block 160, first clears accumulators associated with each possible response "A"-"E" and a total accumulator. The main controller 10 then sets the row counter to N=1 at block 162 and at block 164 sends a "Z" command at block 164 to the first row controller. Upon receipt of a "Z" command from the main controller 10, the row controller unlocks the keypads to which it is coupled, clears each of the keypads LED displays 24 to "001 9" and begins accumulating a response from each of the keypads in one record such that the response made on the first keypad in the row is stored in a first location associated with a survey response for the first keypad; the response from the second keypad in the row is stored in a second location associated with a survey response for the second keypad and so on. Sign-on is not required to take a survey; however, if sign-on information is stored in the row controller's memory, the "Z" command will not clear the information. The main controller 10 waits at block 164 for the "Z" command to be echoed back by the row controller and if it is not echoed back within a predetermined period of time, the main controller 10, at block 168, displays an error message on the instructor's CRT. If the "Z" command is echoed back as determined at block 166, the main controller 10 increments N so that it is equal to N+1 at block 170 and at block 172 determines whether all of the row controllers have been addressed. If N is not equal to 8 for a classroom having seven rows as determined at block 172, the main controller 10 returns to block 164 to re-execute blocks 164 through 172 for the next row controller.

After all of the row controllers have been sent the "Z" command, the instructor may ask a single survey question. The student response data entered thereafter on the keypads is accumulated by each of the row controllers as discussed above. The main controller 10 waits at block 174 until it receives a command from the instructor to stop the survey and in response thereto, at block 176, sets the row counter to N=1. At block 177, the main controller 10 sends a lock keypad command to the first row controller and at block 178 accumulates the responses from that row controller. The main controller 10 accumulates survey responses by incrementing each of the accumulators A-E each time a respective response is received as well as incrementing the total accumulator each time any response is received. At block 180, the main controller 10 increments N to N=N+1 and at block 182 determines whether each of the row controllers has been addressed and if not, the controller 10 returns to blocks 177 and 178 to add the student response data stored in the next row controller to the A-E and total accumulators. If the survey responses from each of the row controllers have been received by the main controller, the controller 10 displays the survey results on the instructor's CRT by indicating, for each response, the number of students who have selected the response as well as the percentage of students selecting the response. The total number of students responding and the total percentage of students responding to the survey question are also displayed. The survey mode thus provides immediate feedback for the instructor.

Figure 9:
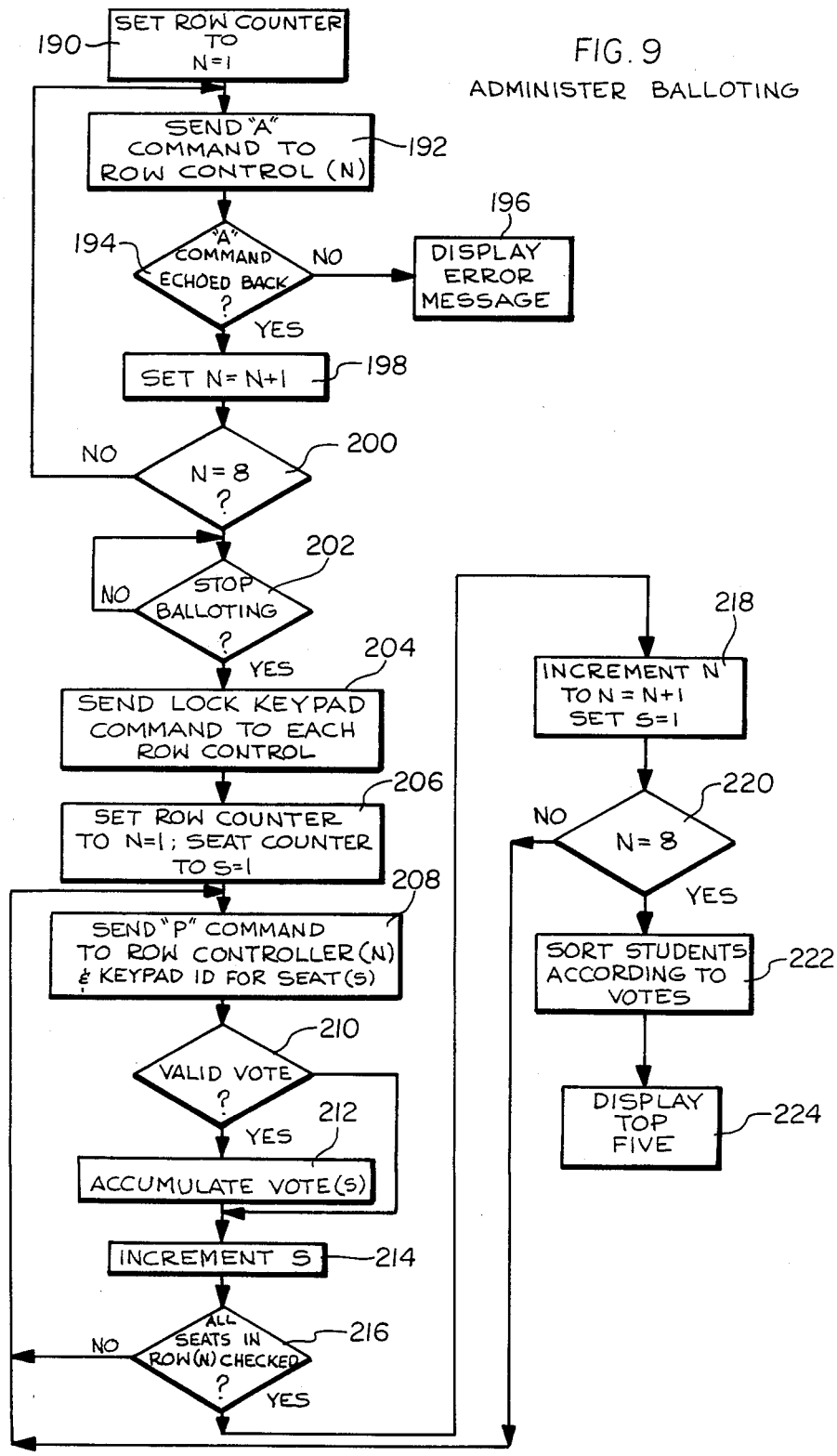
FIG. 9 is a flowchart illustrating the operation of the main controller in processing student election results.

The main controller 10 may also be operated in a Balloting mode or Student Election mode in response to the instructor's selection of the Administer Balloting option from the main menu. As shown in FIG. 9, when operating in the Balloting mode, the main controller first sets the row counter to N=1 at a block 190 and at block 192 sends the "A" command, discussed above, to the first row controller. The row controller responds to the A command by echoing it back to the main controller; clearing the keypads to the initial state of 001 9; clearing its memory including previously entered sign-on information in order to store student identification numbers entered as votes for the students having those numbers. The main controller 10 at block 194 determines whether the "A" command has been echoed back and if not, the controller 10 displays an error message on the instructor's CRT at block 196. When the "A" command is echoed back as determined at block 194, at block 198 the main controller 10 increments N to N=N+1 and at block 200 the main controller determines whether an "A" command has been sent to each row controller in the classroom. After each of the row controllers has received an "A" command, the instructor prompts the students to enter on their keypads the student identification number associated with the student for which he or she is voting. While the students are voting, the main controller 10 waits at block 202 for a stop balloting instruction from the instructor's terminal. When the stop balloting signal is received from the instructor's terminal as determined at block 202, the main controller 10 at block 204 sends the lock keypad command to each of the row controllers. At block 206, the main controller sets the row counter to N=1 and the seat counter to S=1. At block 208 the controller 10 sends the "P" command to the first row controller and also sends to that controller the keypad identification number for the first seat in the row. The first row controller responds to the "P" command and keypad identification number by transmitting back to the main controller 10 the student identification number entered on the first keypad. At block 210, the main controller determines whether this is a valid vote, i.e. whether the student identification number is a valid student identification number for that class. If it is determined at block 210 that the student identification number entered on the first keypad in the first row is valid, the main controller 10 accumulates votes at block 211 and in so doing, the main controller assigns an accumulator to each student who receives a vote and increments the count in each accumulator for each respective vote received. If a vote is not valid as determined at block 210, the main controller skips block 212, ignoring the invalid vote, and goes to block 214 to increment S by 1. At block 216, the main controller determines whether the votes from the keypads associated with each seat in the first row have been received and if not, the controller returns to block 208. If all of the votes have been received, the main controller increments the row number to N=N+1 at block 218 and at block 220 determines whether all of the rows have been addressed. After receiving the balloting data from each of the row controllers, the main controller 10, at block 222, sorts the accumulators according to the number of votes received for each student. At block 224 the main controller 10 then displays the students' names receiving the top five most votes along with the number of votes each of the top five students received and the percentage of the total number of votes received as well as the total number of valid votes entered.

Because the student response system of the present invention centrally processes student response data from a number of different classrooms, student test results may be correlated for all students taking a particular test regardless of whether the students take the test in different classrooms. The main controller may further store a library of test questions with multiple choice responses and a designation of the correct response to enable a teacher to set up a test by merely designating for a particular test number the library question numbers to be designated as test question numbers 1, 2, etc. Thereafter, the main controller may automatically print out the test using the printer 52. When the test question responses for each student in each of the classrooms taking the test are received by the main controller 10, miss rate analysis reports such as depicted in FIG. 10 may be prepared for individual classrooms or for all students taking the test regardless of the classroom. Further, the central processing of student responses from all classrooms allows the balloting or student election operation to the used to elect student body representatives for which all students vote regardless of classroom as well as for the election of individual classroom representatives.

We claim:

1. A student response system for centrally processing student responses obtained from a plurality of classrooms comprising:

a plurality of student input means in each classroom, each input means being operable by a student for providing student response data;

a plurality of student data control means associated with each classroom, each student data control means being coupled to a group of student input means and being responsive to a control command for accumulating, in a particular manner, student response data from the group of student input means to which said student data control means is coupled;

a plurality of instructor input means each associated with a particular classroom and operable by an instructor for providing control data; and a main control means coupled to each instructor input means and each student data control means for processing data therefrom, said main control means being responsive to control data from an instructor input means for providing a control command to each of the student data control means associated with the classroom with which said instructor input means is associated to control the manner in which each of said student data control means accumulates student data.

2. The student response system of claim 1 wherein each of said student input means includes means for entering a student indentification number, a test question number and a response to a test question corresponding to said test question number and said student data control means includes: a memory for storing data from each of the group of student input means in the group to which the memory is coupled; and a processing means which is responsive to a control command from the main control means for storing data representing a response to a test question entered on a student input means in said memory from the student input means to a location in the memory associated with the number of the test question and the student's identification number.

3. The student response system of claim 1 wherein each of said student input means includes means for entering student response data including a student identification number corresponding to a candidate in an election among at least one candidate and said main control means includes: means responsive to a control command from the instructor input means for checking the validity of each student identification number entered on a student input means; means for determining the student identification number entered most often from all of the entered student identification numbers determined to be valid; and means for displaying the most often entered student identification number.

4. The student data response system of claim 1 wherein each of said student input means is associated with a particular seat in a classroom and each is operable by a student for entering student response data including a student identification number and wherein said main control means includes: a memory matrix having a storage location associated with each seat in the classroom wherein the position of a storage location in the matrix represents the position of the storage location's associated seat in the classroom such that the matrix mirrors the classroom; means responsive to a student identification number entered on a student input means associated with a particular seat for storing said student identification number in the memory matrix storage location associated with said particular seat; and means for generating a seating chart from said memory matrix.

5. The student response system of claim 4 wherein said main control means further includes first memory means for storing the name of each student authorized to take a class in a particular classroom, each of said names being stored with the student's identification number; and means for storing in the memory matrix storage location associated with said particular seat the name with each said student identification number in said first memory means.

6. The student response system of claim 1 wherein each of said student input means includes means for entering a test question number with a test question response selected from a predetermined group of allowable responses and said main control means includes: a plurality of accumulation means each associated with one of said possible responses to a test question number for counting the number of times the associated response is entered on a student input means; total means for determining the total number of students entering any response for a particular test question number; means for identifying the correct response associated with a particular test question number according to predetermined criteria; and difficulty index means responsive to the number stored in the accumulation means associated with the correct response identified by said identifying means and to said total means for determining a difficulty index for said test question; and means for generating a report indicating the difficulty index for said particular test question.

7. A student response system for centrally processing student responses obtained from a plurality of classrooms comprising:
   a plurality of student input means in each classroom, each input means being operable by a student for providing student response data;
   a plurality of student data control means associated with each classroom, each student data control means being coupled to a group of student input means and each having:
      a memory for storing data from the student input means to which the student data control means is coupled; and
      a processing means responsive to a control command for controlling the transfer of data out from said memory;
   a plurality of instructor input means each associated with a particular classroom and operable by an instructor for providing control data; and
   a main control means coupled to each instructor input means and each student data control means for processing data therefrom, said main control means being responsive to control data from an instructor input means for providing said control command to each of the student data control means associated with the classroom with which the instructor input means is associated to enable the transfer of data from the memories of the student data control means to said main control means.

8. In a student response system for processing responses from a plurality of students each having a student identification number, a system for automatically compiling student election results comprising:
   a plurality of student input means each operable by a student for entering student response data including a student identification number representing a vote for the student having that number;
   instructor input means operable by an instructor for providing control commands including an election control command which commands a main control means to compile individual votes from the students;
   main control means coupled to each of said student input means and said instructor input means to receive data therefrom, said main control means being responsive to control data from said instructor input means for processing the response data from the student input means in a particular manner and including:
      means responsive to the election control command for checking the validity of each student identification number received from the plurality of student input means; and
      means for determining the student identification number entered most often from all of the entered student identification numbers determined to be valid.

9. The student response system of claim 8 wherein said main control means includes a plurality of accumulating means each associated with a valid student identification number for counting the number of votes entered for the student having the associated student identification number.

10. In a student response system for processing responses from a plurality of students each having a student identification number, means for automatically generating a seating chart for a classroom having a plurality of seats comprising:
   a plurality of student input means each associated with a particular seat in the classroom and each operable by a student for entering student response data including a student identification number;
   instructor input means operable by an instructor for providing control commands;
   main control means coupled to each of said student input means and instructor input means to receive data therefrom, said main control means being responsive to a control command from said instructor input means for processing the response data in a particular manner and including:
      first memory means for storing the name and identification number of each student authorized to take a class, each name being stored with the student's identification number;
      a memory matrix having a storage location associated with each seat in the classroom the position of the storage location in the memory matrix representing the position of the associated seat in the classroom such that said matrix mirrors the classroom;
      means responsive to a first student identification number entered on a student input means associated with a particular seat for storing the first identification number in the memory matrix storage location associated with said particular seat;
      means for storing in the memory matrix storage location associated with said particular seat the name stored with said first identification number in said first memory means; and
      means for generating a seating chart from said memory matrix.

11. The student response system of claim 10 wherein said generating means includes an instructor's display for displaying a seating chart generated from said memory matrix.

12. The student response system of claim 10 wherein said generating means includes a printer for printing a seating chart generated from said memory matrix.

13. The student response system of claim 10 wherein said generating means includes means for generating a seating chart with the name associated with each particular seat being depicted.

14. The student response system of claim 10 wherein said generating means includes means for generating a seating chart with the identification number associated with each particular seat being depicted.

15. In a student response system for processing test question responses from a plurality of students obtained from a plurality of classrooms, means for analyzing the questions on a test comprising:
- a plurality of student input means each operable by a student for entering a test question number along with a test question response selected from a predetermined group of allowable responses;
- a plurality of student data control means associated with each classroom, each student data control means being coupled to a group of student input means and being responsive to a control command for accumulating, in a particular manner, test question numbers and test question responses from each student input means to which said student data control means is coupled;
- a main control means coupled to each student data control means for processing said test question responses, said main control means including:
- accumulation means associated with each possible response to a particular test question number for counting the number of students entering the associated response;
- total means for determining the total number of students entering any response for a particular test question number;
- means for identifying the correct response associated with a particular test question number;
- difficulty index means responsive to the number stored in the accumulation means associated with the correct response identified by said identifying means and to said total means for determining a difficulty index for said test question number; and
- means for generating a report indicating the difficulty index determined for particular question.

16. The student response system of claim 15 further including means responsive to said accumulation means, total means and correct response identifying means for determining a validity index for a particular question, said report generating means indicating the validity index determined for said question.

* * * * *